US 9,130,729 B2

(12) United States Patent
Xu et al.

(10) Patent No.: US 9,130,729 B2
(45) Date of Patent: Sep. 8, 2015

(54) METHOD FOR SPECTRUM ALLOCATION BASED ON INTERFERENCE SUPPRESSION AND USER DIFFERENCE BANDWIDTH REQUIREMENTS

(71) Applicants: Xiaodong Xu, Beijing (CN); Xiaofeng Tao, Beijing (CN); Zhou Xu, Beijing (CN); Huixin Zhang, Beijing (CN); Ping Zhang, Beijing (CN)

(72) Inventors: Xiaodong Xu, Beijing (CN); Xiaofeng Tao, Beijing (CN); Zhou Xu, Beijing (CN); Huixin Zhang, Beijing (CN); Ping Zhang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 101 days.

(21) Appl. No.: 13/907,448

(22) Filed: May 31, 2013

(65) Prior Publication Data
US 2014/0155079 A1    Jun. 5, 2014

(30) Foreign Application Priority Data
Dec. 4, 2012    (CN) .......................... 2012 1 0515006

(51) Int. Cl.
*H04L 5/00*    (2006.01)

(52) U.S. Cl.
CPC ............ *H04L 5/0073* (2013.01); *H04L 5/0037* (2013.01); *H04L 5/0064* (2013.01); *H04L 5/0067* (2013.01); *H04L 5/0075* (2013.01)

(58) Field of Classification Search
CPC ..... H04W 40/00; H04W 72/00; H04W 84/04; H04L 5/00
USPC ............. 455/450, 452.2, 63.1, 449, 447, 446; 370/310, 328, 329, 335, 464, 465, 203, 370/208.3
See application file for complete search history.

(56) References Cited

U.S. PATENT DOCUMENTS 8,369,863 B2 * 2/2013 Xu et al. ..................... 455/452.1
8,503,364 B2 * 8/2013 Zhang et al. .................. 370/328
(Continued)

FOREIGN PATENT DOCUMENTS

| CN | 101662783 A | 3/2010 |
| CN | 102098680 A | 6/2011 |
| CN | 102664855 A | 9/2012 |
| KR | 20100078133 A | 7/2010 |

OTHER PUBLICATIONS

International Search Report (Chinese) issued in International Application No. PCT/CN2012/086415 mailed Sep. 19, 2013.
(Continued)

*Primary Examiner* — Anthony Addy
*Assistant Examiner* — Tanisha Jackson
(74) *Attorney, Agent, or Firm* — McCarter & English, LLP; Jill A. Mello, Esq.; Kia L. Freeman, Esq.

(57) ABSTRACT

The present invention relates to the technical field of wireless communication and of mobile communication, and more particularly to a method for spectrum resource allocation and interference avoidance of femtocell in a heterogeneous environment consisting of macro cell and femtocell, and specifically to a spectrum allocation method based on interference suppression and user difference bandwidth requirements. According to the spectrum allocation method based on interference suppression and user difference bandwidth requirements of the present invention, spectrum resource can be allocated reasonably according to the priority level of bandwidth requirements in combination with graph coloring algorithm and chromaticity preference algorithm. In this manner, in-layer interference among femtocells and cross-layer interference among femtocells and macro cells can be effectively suppressed, the difference bandwidth requirements of femtocell users can be satisfied, and the efficiency of frequency utilization and the whole throughput of system can be also optimized to the maximum extent.

9 Claims, 4 Drawing Sheets

(56) References Cited

U.S. PATENT DOCUMENTS

| | | | |
|---|---|---|---|
| 8,600,394 B2* | 12/2013 | Auer et al. | 455/447 |
| 8,737,375 B2* | 5/2014 | Puthenpura et al. | 370/342 |
| 2010/0169498 A1* | 7/2010 | Palanki et al. | 709/228 |
| 2011/0222506 A1* | 9/2011 | Szymanksi | 370/330 |

OTHER PUBLICATIONS

International Search Report (English) issued in International Application No. PCT/CN2012/086415 mailed Sep. 19, 2013.

\* cited by examiner

```
┌─────────────────────────────────────────────────────────────────┐
│ Coloring results after coloring is completed:                   │
│                                                                 │
│   K,  A = {a_{i,j}}_{N×K}   C = {c_1, c_2, ···, c_k}_{K×1}      │
└─────────────────────────────────────────────────────────────────┘
                                │
                                ▼
┌─────────────────────────────────────────────────────────────────┐
│ Proportion adjusting factor λ, dividing the available spectrum  │
│ sets into K groups according to proportion                      │
│ $\lambda + c_1 : \lambda + c_2 : \cdots : \lambda + c_K$,       │
│ which corresponds to colors with color notations ranged from    │
│ 1 to K                                                          │
└─────────────────────────────────────────────────────────────────┘
                                │
                                ▼
┌─────────────────────────────────────────────────────────────────┐
│ Based on $A = \{a_{i,j}\}_{N \times K}$ and the corresponding   │
│ relationship between available spectrum resource sub-sets and   │
│ colors, allocating spectrum resource to the femtocells          │
└─────────────────────────────────────────────────────────────────┘
                                │
                                ▼
┌─────────────────────────────────────────────────────────────────┐
│ adjusting their own wireless transmission parameters by the     │
│ femtocells so as to perform a reliable communication at the     │
│ allocated frequency range                                       │
└─────────────────────────────────────────────────────────────────┘
```

Fig. 5 ns spectrum resource allocation. When most users are satisfied with basic bandwidth and another small part of users requires more spectrum bandwidth and data traffic, allocating spectrum resource in combination with user difference bandwidth requirements can allocate the whole resource of network effectively. Therefore, it is necessary to efficiently design a solution for allocating spectrum based on interference suppression and user difference bandwidth requirements in the field.

METHOD FOR SPECTRUM ALLOCATION BASED ON INTERFERENCE SUPPRESSION AND USER DIFFERENCE BANDWIDTH REQUIREMENTS

RELATED APPLICATIONS

This application claims the benefit of Chinese Application No. CN 201210515006.3, filed Dec. 4, 2012, the entire contents of which is hereby expressly incorporated herein by reference.

FIELD OF THE INVENTION

The invention relates to the technical field of wireless communication and of mobile communication, and more particularly to a method for spectrum resource allocation and interference avoidance of femtocell in a heterogeneous environment consisting of macro cell and femtocell, and specifically to a spectrum allocation method based on interference suppression and user difference bandwidth requirements.

BACKGROUND OF THE INVENTION

In a conventional cellular system, the network consists of macro cells having a coverage scope generally ranged from 1 km to 25 km, which is a large radius so that a strong transmission power is necessary. Usually, transmission antenna of a macro cell is erected above surrounding buildings, and there is no direct antenna used between transmission and reception. In order to meet requirement of high rate data communication in modern wireless communication, higher spectrum reuse rate can be achieved by cell splitting, such that the throughput per unit area is improved. In 3GPP standard, femtocell, also called as home base station, is proposed as a technical standard for improving efficiency of frequency utilization and enlarging indoor wireless coverage rate. With a general transmission distance ranged from 10 m to 50 m, femtocell is mainly used for residence or enterprise environment. Featured by e.g. low power consumption, low cost and small coverage, etc., femtocell attracts much attention from researchers and operators. Statistics shows that in China more than 70% of data communication and voice service is performed indoors. In addition, with generation of respective applications, communication bandwidth requirements increase gradually. Also, in view of urban construction and population concentration, it can be predicted that, in the near future, a large quantity of femtocells will be deployed in various buildings such as residential community or commercial blocks.

However, because one and the same fraction of spectrum is used among different femtocells and among femtocells and macro cells, when femtocells are deployed densely, serious co-channel interference will be generated among users of different femtocells and among users of femtocells and of macro cells. Co-channel interference will negatively influence on reliable transmission of wireless communication, and also reduce wireless transmission rate and system throughput. Therefore, a solution for reasonable spectrum allocation is required for suppressing interference of the above two kinds of heterogeneous network environments so as to improve frequency utilization rate and system throughput. Statistics shows that, top 10% of mobile users in a mobile network consume almost 90% of bandwidth resource of mobile internet. Due to the difference of bandwidth resource consumption, it is necessary to consider different bandwidth requirements of users in spectrum resource allocation. When most users are satisfied with basic bandwidth and another small part of users requires more spectrum bandwidth and data traffic, allocating spectrum resource in combination with user difference bandwidth requirements can allocate the whole resource of network effectively. Therefore, it is necessary to efficiently design a solution for allocating spectrum based on interference suppression and user difference bandwidth requirements in the field.

Currently, research on how to suppress co-channel interference among femtocell users and among femtocell users and macro cell users is rarely reported. In this field, it is difficult to solve the problem of how to suppress the above two kinds of interference by a solution of reasonably allocating spectrum resource and at the same time satisfying user difference bandwidth requirements.

SUMMARY OF THE INVENTION

An object of the present invention is to provide a spectrum allocation method based on interference suppression and user difference bandwidth requirements, which can effectively suppress in-layer interference among femtocells and cross-layer interference among femtocells and macro cells, satisfy user difference bandwidth requirements, and at the same time maximize the frequency utilization efficiency and the whole system throughput.

Therefore, the present invention provides a spectrum allocation method based on interference suppression and user difference bandwidth requirements, comprising the following steps:

Step 1, collecting overhead information detected by femtocell users in a regular manner;

Step 2, establishing an interference topology graph based on the overhead information and determining an available spectrum resource set;

Step 3, coloring the interference topology graph based on the priority level of bandwidth requirements of the femtocell users through chromaticity preference algorithm; and Step 4, according to the coloring results from Step 3, establishing a corresponding relationship between available spectrum resource set and color so as to allocate spectrum resource to the femtocell users.

Preferably, the overhead information comprises the spectrum resource occupation status of a macro cell where the femtocell users are located and the ID numbers of neighboring femtocells that may be suffered from co-channel interference.

Preferably, in Step 2, the bandwidth requirements are classified into a plurality of priority levels according to different bandwidth usage of the femtocell users.

Preferably, in Step 2, the bandwidth requirements are classified into two priority levels according to different bandwidth usage of the femtocell users.

Preferably, Step 2 further comprises the following:

Step 201, establishing an interference topology graph, wherein each node represents a femtocell and the connecting line between nodes represents that use of co-channel signal will generate interference in the femtocells connected by the connecting line; and Step 202, the topology graph consisting of a plurality of clusters which are not connected with each other; defining the number of the nodes in a cluster as N, then a set consisting of all nodes in the cluster is $V=\{v_1, v_2, \ldots, v_N\}_{N\times 1}$; defining the available spectrum detected by node $v_m$ is $I_m$, then the available spectrum in the cluster is $$I = \bigcap_{m=1}^{m=N} I_m,$$

wherein the available spectrum of all clusters forms an available spectrum resource set.

Preferably, Step 3 further comprises the following:

Step 301, calculating degree of each node in a cluster, and adding all the nodes in the cluster into set U;

S302, allocating a color notation to the node with the largest degree in set U according to the priority level of bandwidth requirements so as to complete coloring, and then removing the node from set U;

S303, calculating the chromaticity value of the nodes not being colored in Set U, selecting a node with the largest chromaticity value therefrom, coloring said node according to the bandwidth requirement priority level based on the lowest color notation, and removing said node from set U after coloring;

S304, if set U is empty, proceeding to Step 4; otherwise, proceeding to Step 303.

Preferably, Step 303 comprises, if there exists more than one nodes with the largest chromaticity value, selecting the node with the largest degree therefrom.

Preferably, coloring said node according to the bandwidth requirement priority level based on the lowest color notation of Step 303 further comprises:

determining whether all the neighboring cells of said node are colored by the color with a color notation j;

if yes, coloring said node with the color notation j and the bandwidth requirement priority level;

if not, modifying the value of j to j+1, and repeating the above steps, wherein the initial value of j is 1.

Preferably, the coloring result includes the largest color notation, the color usage frequency matrix and the coloring recording matrix that are used during coloring.

Preferably, establishing a corresponding relationship between available spectrum resource set and color of Step 4 further comprises:

Step 401, setting a proportion adjusting factor

Step 402, dividing the available spectrums of all clusters into K groups according to proportion $\lambda+c_1$: $\lambda+c_2$: . . . :$\lambda+c_K$, wherein K represents the largest color notation during the coloring of the cluster, and $c_i$, represents the usage frequency of the ith color during the coloring of the cluster.

According to the spectrum allocation method based on interference suppression and user difference bandwidth requirements of the present invention, spectrum resource can be allocated reasonably according to the priority level of bandwidth requirements in combination with graph coloring algorithm and chromaticity preference algorithm. In this manner, in-layer interference among femtocells and cross-layer interference among femtocells and macro cells can be effectively suppressed, the difference bandwidth requirements of femtocell users can be satisfied, and the efficiency of frequency utilization and the whole throughput of system can be also optimized to the maximum extent.

BRIEF DESCRIPTION OF THE DRAWINGS

FIG. 5 shows the flowchart of allocating spectrum resource to nodes in a cluster according to the spectrum allocation method of FIG. 2.

DETAILED DESCRIPTION OF THE INVENTION

The present invention will be illustrated in detail below in combination with the accompanying drawings and embodiments. It should be understood that the following embodiments are merely illustrative, and are not meant to limit the scope of the present invention.

Figure 1:
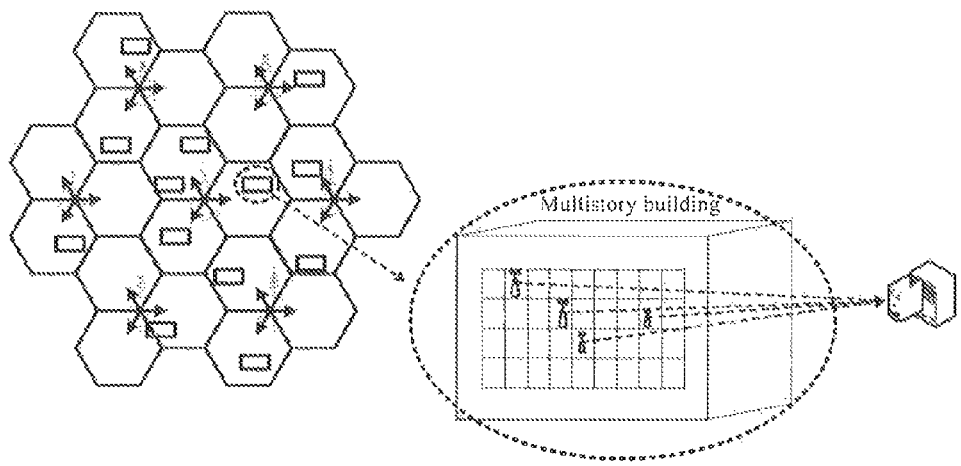
FIG. 1 is a schematic diagram of network heterogeneous environment, in which macro cells and femtocells coexist, of the present invention.

In order to better illustrate the present invention, a network heterogeneous environment in which macro cells and femtocells coexist will be explained with reference to FIG. 1. In the environment, dense deployment of femtocell base stations will generate co-channel interference among femtocells in one layer and co-channel interference among femtocells and macro cells in different layer. The co-channel interference among femtocells and the macro cells will be particular serious when users of a macro cell enter into a closed femtocell. Co-channel interference will negatively influence on reliable transmission of wireless communication, and also reduce wireless transmission rate and system throughput.

Figure 2:
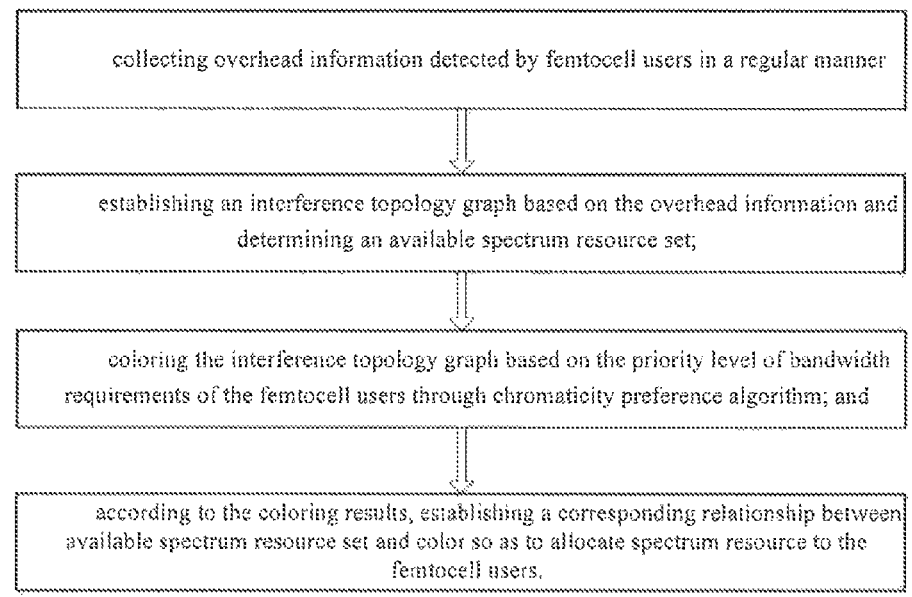
FIG. 2 shows the flowchart of the spectrum allocation method of the present invention.

Shown in the flowchart of FIG. 2, a spectrum allocation method based on interference suppression and user difference bandwidth requirements mainly comprises the following steps.

Step 1: Collecting overhead information detected by femtocell users in a regular manner. Specifically, in the present embodiment, a femtocell user detects communication information around the femtocell by using cognitive radio technology or any other technique already known. A wireless terminal automatically obtains spectrum usage status of the wireless environment around, and adjusts its own wireless transmission parameters correspondingly so as to complete wireless transmission in a corresponding frequency range. The femtocell user reports the detected overhead information to a corresponding base station, wherein the overhead information includes the spectrum resource occupation status of the macro cell where the femtocell user is located and the ID numbers of neighboring femtocells which may lead to co-channel interference, etc. Finally, the gateway of the femtocells collects all overhead information together.

Figure 3:
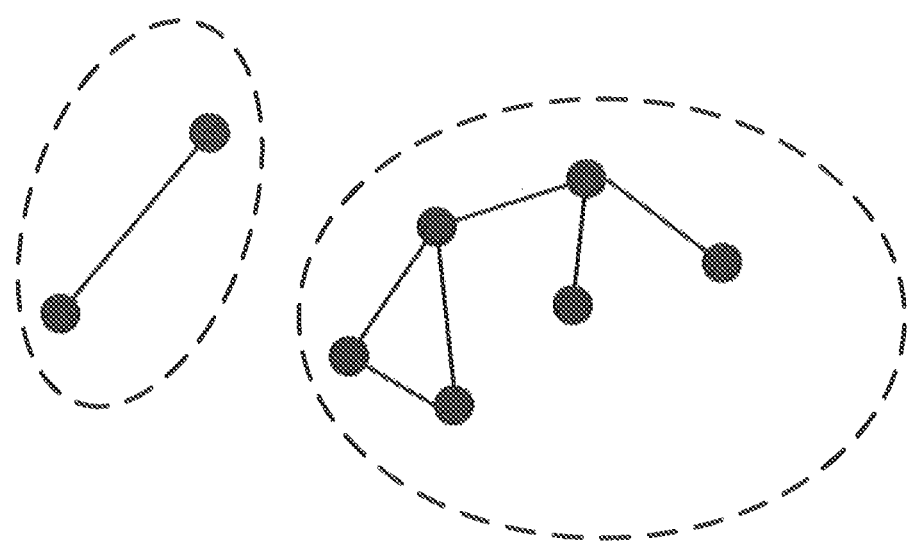
FIG. 3 is a schematic diagram of part of the topology graph according to the spectrum allocation method in FIG. 2.

Step 2: Establishing an interference topology graph in combination with all overhead information collected by the gateway of the femtocells, and determining an available spectrum resource set. Specifically, Step 2 mainly comprises the following:

Step 201, establishing an interference topology graph as shown in FIG. 3, wherein each node represents a femtocell, and the connecting line between nodes represents that use of co-channel signals will generate interference in the femtocells connected by the connecting line; and Step 202, the topology graph consisting of a plurality of clusters which are not connected with each other. Taking one cluster as an example, the number of the nodes in the cluster is defined as N, a set consisting of all nodes in the cluster is defined as $V=\{v_1, v_2, \ldots, v_N\}_{N\times 1}$, a set consisting of all connecting lines is defined as $E=\{e_{i,k}|e_{i,k}\in\{0,1\}\}_{N\times N}$, wherein $e_{i,k}=1$ represents that node $v_i$ and node $v_k$ both detect that they are neighboring cells with co-channel interference to each other. The available spectrum detected by node $v_m$ in set V is $I_m$, i.e., the free spectrum resource not occupied by the macro cell but detected by node $v_m$. In order to avoid the problems such as hidden terminals and detection failure of a single base station, the available spectrum in the cluster is defined as $$I = \bigcap_{m=1}^{m=N} I_m.$$

Available spectrums of all clusters form an available spectrum resource set.

Figure 4:
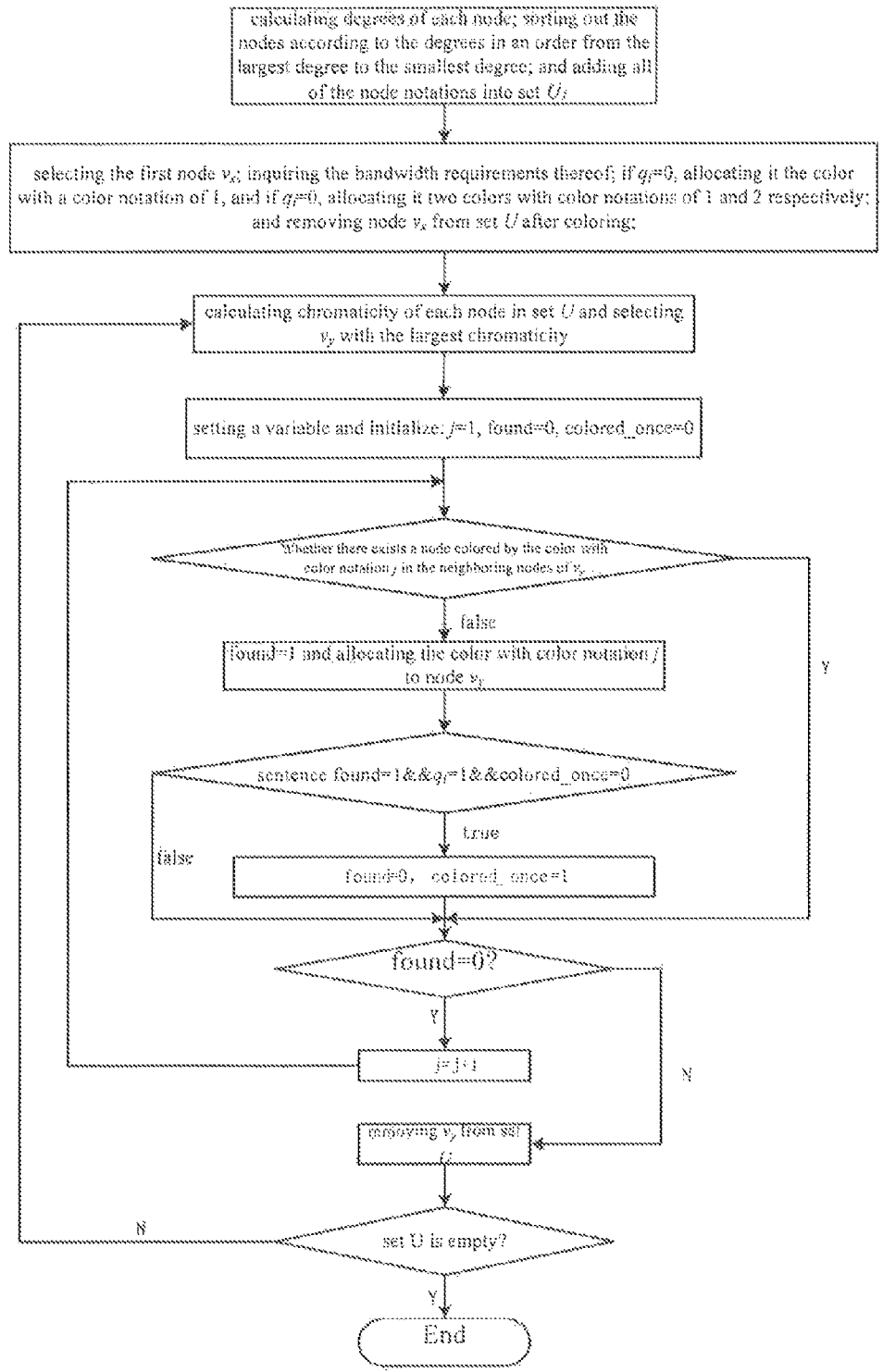
FIG. 4 shows the flowchart of coloring all the nodes in a cluster according to the spectrum allocation method of FIG. 2.

Step 3: Coloring the interference topology graph by means of chromaticity preference algorithm in combination with priority levels of bandwidth requirements of femtocell users. Based on the fact that a small part of users occupies most part of bandwidth resource of the system, the bandwidth requirements are classified into a plurality priority levels according to different bandwidth usage of the femtocell users. For example, in the present embodiment, the bandwidth requirements are classified into two levels, i.e. high priority level and low priority level, according to different bandwidth usage of the femtocell users. Generally speaking, users with the high priority level of bandwidth requirements account for 20% of all network users in a real communication system. A bandwidth requirement matrix is defined as $Q=\{q_i|q_i \in \{0,1\}\}_{N \times 1}$, which represents the bandwidth requirement priority level is low when $q_i=0$, while represents the bandwidth requirement priority level is high when $q_i=1$. The procedure of coloring the interference topology graph by means of chromaticity preference algorithm is shown in FIG. 4. Because the coloring procedure of each cluster is basically the same as each other, the coloring procedure will be illustrated with reference to the nodes of one cluster, which mainly comprises the following:

Step 301: Calculating degrees of each node in the cluster, i.e.

$$d_i = \sum_{k=1}^{n} c_{i,k},$$

sorting out the nodes according to the degrees in an order from the largest degree to the smallest degree, and adding all of the node notations $v_i$ in the cluster into Set U;

S302, selecting the first node $v_x$, i.e., the node with the largest degree, from set U, and inquiring the bandwidth requirements thereof; if $q_i=0$, allocating it the color with a color notation of 1, i.e., $a_{x,k}=\{0,1\}$, and if $q_i=0$, allocating it two colors with color notations of 1 and 2 respectively, i.e., $a_{x,k}=\{1,2\}$; and removing node $v_x$ from set U after coloring;

S303, calculating the chromaticity of the nodes not being colored in set U, wherein the chromaticity of node $v_i$ refers to number of colors which have been allocated to the neighboring nodes connected to node $v_i$; selecting node $v_y$ with the largest chromaticity therefrom (if there exists more than one node with the largest chromaticity, selecting the node with the largest degree); based on the lowest notation, coloring the node according to the bandwidth requirement priority level; and removing node $v_y$ from set U after node $v_y$ is colored;

Step 304, if set U is empty, proceeding to Step 4; otherwise, proceeding to Step 303.

After all the colorings are completed, the coloring results obtained include the largest color notation K which is used in the node coloring procedure of each cluster. The color usage frequency matrix is defined as $C=\{c_1, c_2, \ldots, c_k\}_{K \times 1}$, wherein times of usage of colors with the color notations from 1 to K are recorded. The coloring recording matrix is defined as $A=\{a_{i,j}|a_{i,j} \in \{0,1\}\}_{N \times M}$, wherein "$a_{i,j}=1$" represents that node $v_i$ is colored by the color with color notation j.

In this case, in Step 303, the procedure of coloring the node according to the priority level of bandwidth requirements based on the lowest color notation and mainly comprises the following steps:

(1) setting a variable and initializing, taking the color notation j=1 as the initial value for obtaining the lowest color notation, using found=0 to indicate whether the lowest color notation for node $v_y$ is found, wherein colored_once=0 is used to indicate whether node $v_y$ has been colored once;

(2) determining whether a node colored by the color with color notation j exists in all the neighboring nodes of node $v_y$; if not, proceeding to step (3), if yes, proceeding to step (5);

(3) enabling found=1 and allocating the color with color notation j to node $v_y$;

(4) determining whether sentence found=1&& $q_i$=1 &&colored_once=0 is true, i.e. determining whether the node found has the lowest color notation, high level priority of bandwidth requirements and not been colored once; if it is true, enabling found=0 and colored_once=1;

(5) determining whether found is 0; if yes, then j=j+1 and proceeding to step (2); if found=1, then terminating the calculation and completing coloring of node $v_y$.

Step 4: Based on the coloring results from Step 3, establishing a corresponding relationship between the available spectrum resource set and color, and allocating spectrum resource to the femtocell users. As shown in FIG. 5, Step 4 of the present embodiment mainly comprises the following steps:

Step 401, if allocating more spectrum resource to the color which is used frequently, the whole efficiency of spectrum utilization can be improved; in order to take user fairness into consideration, setting a proportion adjusting factor λ.

Step 402, the available spectrum of each cluster can be divided into K groups according to proportion $\lambda+c_1:\lambda+c_2:\ldots:\lambda+c_K$ which corresponds colors with color notations ranged from 1 to K respectively, wherein K represents the largest color notation during the coloring of the cluster, $c_i$ represents the usage frequency of the ith color during the coloring of the cluster; and the value of λ can be suitably adjusted so as to achieve a balance between the spectrum usage rate and user fairness.

Step 403, based on the coloring result $A=\{a_{i,j}\}_{N \times K}$ and the corresponding relationship between the spectrum resource set and color in Step 402, allocating orthogonal spectrum resource to the femtocell users, and then adjusting system parameters to corresponding frequency ranges so as to perform a reliable communication.

Further, the method may comprise, in order to suppress two kinds of co-channel interference, i.e. the interference among femtocells and the interference of femtocells on macro cells, checking the spectrum resource status regularly and updating data, and simultaneously carrying out the above steps Step 1 to Step 4.

According to the present invention, the spectrum resource allocated to the femtocell users can realize interference suppression and user difference bandwidth requirements. This is because: femtocells will not use spectrum resource by detecting spectrum resource occupation information of macro cells, thus suppressing the interference of the femtocells on the macro cell users; orthogonal spectrum resource is allocated to neighboring cells by establishing the interference topology graph and using the graph coloring algorithm, thus suppressing the inter-interference among femtocell cells; after the interference is suppressed, the efficiency of frequency utilization and the whole system throughput can be optimized to the maximum extent; and the node of a user with a high level priority of bandwidth requirements has been colored twice, and its allocated spectrum resource is twice of that of a user with a low level priority of bandwidth requirements, and therefore the communication requirement for users with a high priority level is met. Thus the spectrum allocation method based on interference suppression and user difference bandwidth requirements according to the present invention provides a powerful technical support and builds a solid foundation for large-scale application of heterogeneous network in future.

The embodiments as mentioned above should be considered as illustrative and not restrictive. All changes, equivalents and variations, which come within the spirit and scope of the present invention and are known to one skilled in the art, fall within the protection scope of the present invention.

The invention claimed is:

1. A spectrum allocation method based on interference suppression and user difference bandwidth requirements, comprising:

Step 1, collecting overhead information detected by femtocell users;

Step 2, establishing an interference topology graph based on the overhead information and determining an available spectrum resource set, wherein the Step 2 further comprises:

Step 201, establishing an interference topology graph, wherein each node represents a femtocell and a connecting line between nodes represents that use of a co-channel signal will generate interference in the femtocells connected by the connecting line; and Step 202, the topology graph consisting of a plurality of clusters which are not connected with each other; defining the number of the nodes in a cluster as N, then a set consisting of all nodes in the cluster is $V = \{v_1, v_2, \ldots, v_N\}_{N \times 1}$; defining the available spectrum detected by node $v_m$ is $I_m$, then the available spectrum in the cluster is $$I = \bigcap_{m=1}^{m=N} I_m,$$

wherein the available spectrum of all clusters forms the available spectrum resource set;

Step 3, coloring the interference topology graph based on the priority level of bandwidth requirements of the femtocell users through chromaticity preference algorithm; and Step 4, according to the coloring results from Step 3, establishing a corresponding relationship between the available spectrum resource set and color so as to allocate spectrum resource to the femtocell users.

2. The method of claim 1, wherein the overhead information comprises the spectrum resource occupation status of a macro cell where the femtocell users are located and the ID numbers of neighboring femtocells that may be suffered from co-channel interference.

3. The method of claim 1, wherein in Step 2, the bandwidth requirements are classified into a plurality of priority levels according to different bandwidth usage of the femtocell users.

4. The method of claim 3, wherein in Step 2, the bandwidth requirements are classified into two priority levels according to different bandwidth usage of the femtocell users.

5. The method of claim 1, wherein Step 3 further comprises:

Step 301, calculating degree of each node in a cluster, and adding all the nodes in the cluster into set U;

Step 302, allocating a color notation to the node with the largest degree in set U according to the priority level of bandwidth requirements so as to complete coloring, and then removing the node from set U;

Step 303, calculating the chromaticity value of the nodes not being colored in Set U, selecting a node with the largest chromaticity value therefrom, coloring said node according to the bandwidth requirement priority level based on the lowest color notation, and removing said node from set U after coloring;

Step 304, if set U is empty, proceeding to Step 4; otherwise, proceeding to Step 303.

6. The method of claim 5, wherein Step 303 comprises, if there exists more than one nodes with the largest chromaticity value, selecting the node with the largest degree therefrom.

7. The method of claim 5, wherein coloring said node according to the bandwidth requirement priority level based on the lowest color notation of Step 303 further comprises:

determining whether all the neighboring cells of said node are colored by the color with a color notation j;

if yes, coloring said node with the color notation j and the bandwidth requirement priority level;

if not, modifying the value of j to j+1, and repeating the above steps, wherein the initial value of j is 1.

8. The method of claim 5, wherein the coloring result includes the largest color notation, the color usage frequency matrix and the coloring recording matrix that are used during coloring.

9. The method of claim 5, wherein establishing a corresponding relationship between available spectrum resource set and color of Step 4 further comprises:

Step 401, setting a proportion adjusting factor $\lambda$:

Step 402, dividing the available spectrums of all clusters into K groups according to proportion $\lambda + c_1 : \lambda + c_2 : \ldots : \lambda + c_K$, wherein K represents the largest color notation during the coloring of the cluster, and $C_i$ represents the usage frequency of the ith color during the coloring of the cluster.

* * * * *